United States Patent [19]

Coad

[11] 4,409,181
[45] Oct. 11, 1983

[54] BRAZING COMPOSITIONS
[75] Inventor: Brian C. Coad, San Francisco, Calif.
[73] Assignee: GTE Products Corporation, Stamford, Conn.
[21] Appl. No.: 295,926
[22] Filed: Aug. 24, 1981
[51] Int. Cl.$^3$ .................. C22C 5/08; C22C 28/00; C22C 30/02
[52] U.S. Cl. .................. 420/502; 420/504; 420/429; 420/581; 420/582; 420/587; 420/589
[58] Field of Search ............ 75/173 C, 134 F, 134 C, 75/134 N, 251, 255, 247, 153, 154, 157.5; 428/606; 420/581, 582, 587, 589, 502, 504, 429

[56] References Cited
U.S. PATENT DOCUMENTS 2,362,893 11/1944 Durst ..................... 75/173 C X
3,000,339 9/1961 Coxe ..................... 75/247 X
4,052,531 10/1977 Steine et al. ............. 75/134 C X
4,182,628 1/1980 D'Silva ................... 75/173 C X Primary Examiner—L. Dewayne Rutledge
Assistant Examiner—David A. Hey
Attorney, Agent, or Firm—Donald R. Castle

[57] ABSTRACT

A composition is provided consisting essentially of from about 50% to about 99% by weight of a silver-copper based brazing alloy and as an additive, from about 1% to about 50% to the composition, of a metal or metal alloy having essentially the same density as the brazing alloy and being essentially insoluble in the brazing alloy. The additives are selected from (a) molybdenum, (b) mixtures of molybdenum and at least one metal selected from the group consisting of cobalt, iron and tungsten and (c) mixtures of tungsen and at least one metal selected from iron and cobalt.

4 Claims, No Drawings

BRAZING COMPOSITIONS

BACKGROUND OF THE INVENTION

This invention relates to brazing. More particular it relates to precious metal brazing compositions.

In brazing operations using precious metal brazing alloys the use of other materials in conjunction therewith to provide a desired joint thickness is disclosed in U.S. Pat. No. 2,606,362. In U.S. Pat. No. 2,606,362 tungsten particles having a diameter and thickness approaching that of the composite foil are disclosed. By use of these particles the proper spacing between the parts to be joined is maintained and the desired joint thickness is obtained.

Molybdenum has also been used as a constituent in silver-copper brazing alloys for joining tungsten parts. In *Modern Metal Joining Techniques*, Swartz, Wiley-Interscience, a division of John Wiley and Sons, New York, 1969, page 337, a number of brazes having liquidus temperatures of from 1200° F. to 5500° F. are disclosed. Three Ag-Cu alloys are disclosed which contain molybdenum. No percentages of constituents are given. Silver and copper do not alloy with tungsten. If the braze metal does not alloy with the parent metal being brazed, the joint will be strong at low temperatures but weak at high tempertures. Articles made from tungsten are normally used at high temperature application, therefore, it is believed that the molybdenum portion of the Ag-Cu-Mo alloys reported in *Modern Metal Joining Techniques*, supra, is present as an alloying ingredient to alloy with the tungsten that is being brazed.

Certain silver-copper brazing alloys are well known. In general such brazing alloys contain from about 40 to about 72% silver, from about 25% to about 40% of copper and may contain from about 5 to about 40% of metals selected from tin, cadmium, zinc and indium. Such alloys have liquidus temperatures in the range of from about 700° C. to about 780° C. As can be appreciated the costs of such alloys has risen dramatically during the past few years due to the cost of silver.

It is believed therefore that a brazing composition having essentially the same properties as the prior silver-copper brazing alloys but at an appreciably lower price would be an advancement in the art.

SUMMARY OF THE INVENTION

In accordance with one aspect of this invention there is provided a composition consisting essentially of from about 50% to about 99% by weight of a silver-copper based brazing alloy and as an additive, from about 1% to about 50% to the composition, of a metal or metal alloy having essentially the same density as the brazing alloy and being esentially insoluble in the brazing alloy. The additives are selected from (a) molybdenum, (b) mixtures of molybdenum and at least one metal selected from the group consisting of cobalt, iron and tungsten and (c) mixtures of tungsten and at least one metal selected from iron and cobalt.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

It has been found that certain additives can be added to silver-copper based brazing alloys in amounts from about 1% to about 50% without appreciably effecting the performance of the braze. The additive has to be nearly or completely insoluble in the silver-copper based braze in the liquid or solid state at temperatures up to and slightly above normal brazing temperatures. For silver-copper based brazing alloys normal brazing temperatures can be as high as 850° C. The additive must have the foregoing solubility characteristics in order not to effect the liquidus or solidus temperature of the braze. Solubility of the additive will result alteration of the melting point of the brazing composition and thus alter the brazing process. Additionally, the additive must have a density approaching that of the braze. If the additive has a density much higher or lower than the braze, when the brazing alloy is melted during brazing gravity forces will cause a separation of the additive whereas if the additive has essentially the same density little or no segregation or separation will occur and the additive will remain relatively uniformly distributed throughout the brazing alloy. For purposes of this invention an additive having a density within the range of from about 95% to about 105% of the density of the silver-copper braze or solder is sufficiently close to prevent segregation. It is preferred, however, that the density of the additive be from about 98% to about 102% of the density of the silver-copper braze or solder. The density of most silver-copper brazing alloys will generally range from about 95 grams/cc to about 10.1 grams/cc. The materials that can be used as additives are limited. Silver-copper based brazing alloys can be essentially all silver and copper. Generally a 72% silver and 28% copper (the eutectic of the Ag-Cu binary system) is used. This alloy is sold under the trade name of Cusil by the Wesgo Division of GTE Products Corporation. The density of this brazing alloy is about 10.05 grams/cc. Molybdenum having a density of about 10.22 grams/cc can be used as the additive for Cusil. Mixtures of molybdenum, tungsten, and iron can also be used. For example, a mixture or alloy containing about 9% molybdenum, about 74% by weight of iron and about 17% by weight of tungsten will have a density of about 10.05 grams/cc therefore would be a suitable additive for a brazing alloy containing about 72% silver and 28% by weight of copper since that brazing alloy would also have a density of about 10.05 grams/cc.

As previously mentioned, the silver-copper based brazing alloys improved by the present invention, may contain other materials. For example, they contain cadmium, zinc, tin and indium in amounts of from about 5% to about 15% by weight. Examples of such alloys are given below in Table I.

TABLE I

| Trade Names | Element (% by weight) | | | | | | Theoretical Density |
|---|---|---|---|---|---|---|---|
| | Ag | Cu | Cd | Zn | In | Sn | |
| Cusiltin 5 | 68 | 27 | — | — | — | 5 | 9.829 |
| Incusil 10 | 63 | 27 | — | — | 10 | — | 9.751 |
| Cusiltin 10 (AMS 4773) | 60 | 30 | — | — | — | 10 | 9.544 |
| Incusil 15 | 61.5 | 24 | — | — | 14.5 | — | 9.659 |
| Easy Fo 45 | 45 | 15 | 24 | 16 | — | — | 9.285 |
| Cusil | 72 | 28 | | | | | 10.05 |

In general, these alloys have a liquidus temperature of from about 700° C. to about 780° C. Other silver-copper brazing alloys are known which contain titanium palladium and/or nickel. Since iron, cobalt, and molybdenum are soluble in nickel, thus nickel containing silver-copper alloys can not be utilized in the practice of the present invention. Metals which are insoluble in silver, copper, indium, cadmium, zinc, and tin are molybdenum, iron, cobalt, and tungsten. Each of these elements is soluble in titanium and in palladium.

Examples of suitable additives for the alloy containing about 45% by weight of silver, about 15 by weight of copper, about 24% by weight of cadmium and about 16% by weight of zinc, having a density of about 9.25 grams/cc, are an alloy of about 12% by weight of tungsten balance iron or an alloy of about 60% by weight of molybdenum and about 40% by weight of iron because these alloys would also have a density of about 9.285 grams/cc.

To more fully illustrate the subject invention the following detailed examples are presented. All parts, percentages and proportions are given by weight unless otherwise specified:

EXAMPLE I

Five samples containing about 300 parts each of brazing alloy sold under the trade name of Cusil by the Wesgo Division of GTE Products Corporation and having the composition of 72% silver and 28% copper and below 150 mesh particle size are each blended with appropriate amounts of a molybdenum powder having below 200 mesh particle size to give the following percentage of materials:

| Sample | Percentages By Weight Cusil | Molybdenum |
|---|---|---|
| 1 | 90 | 10 |
| 2 | 80 | 20 |
| 3 | 70 | 30 |
| 4 | 60 | 40 |
| 5 | 50 | 50 |

Using conventional powder metallurgy techniques, the samples are rolled to form a thickness of about 0.004 inches. Micrographs of the foil show that the molybdenum is relatively uniformly distributed throughout the foil.

The above five samples are compared to a standard 72 Ag, 28 Cu braze without molybdenum addition by the following tests.

Strips of 304 Stainless Steel measuring 0.125" thick × 1⅛" wide × 5" long are milled for flatness and heated in hydrogen atmosphere from about 980° C. to about 1040° C. to insure any oxide is removed from the surfaces to be brazed. Brazing is done using electric resistance heating to about 830° C. All brazed samples including the standard had good microstructures with continuous filling and freedom from discontinuities or defects. Tensile Strength tests on the brazed joints show that while the tensile shear strength as measured in KSI varied from 11.0 KSI to 17.4 KSI for the brazing compositions containing molybdenum, the average strength was about 13.8 KSI which compares favorably to 13.1 KSI for the 72 Ag, 28 Cu braze without molybdenum. The 11.0 KSI tensile shear strength for the 50% molybdenum material indicates the maximum amount of additive that can be added.

Similar results are achieved when T pieces of 410 Stainless Steel are brazed at about 900° C. for about 15 minutes in vacuum.

Substantially similar results are achieved when instead of the foregoing Ag-Cu braze a Ag-Cu-Sn alloy is the brazing alloy and a mixture of iron and molybdenum is used as the additive. For example, Cusiltin 10 (AMS 4773) is a 60 Ag 30 Cu 10 Sn alloy having a density of about 9.544. An example of a suitable additive contains about 62.4% Mo and 37.6% iron.

While preferred embodiments of this invention have been described and illustrated, it is to be recognized that modifications and variations thereof may be made without departing from the spirit and scope of this invention as described in the appended claims.

What is claimed is:

1. A brazing material consisting essentially of a foil having a composition consisting essentially of
   (a) from about 50% to about 99% by weight of a brazing alloy consisting essentially of from about 25% to about 40% by weight of copper, from 0 to about 25% by weight of a metal selected from the group consisting of Zn, In, Cd, Sn and mixtures thereof, balance silver
   (b) from about 1% to about 50% by weight of an additive that is insoluble in said brazing alloy selected from the group consisting of
   (1) molybdenum
   (2) mixtures of molybdenum and a metal selected from Fe, Co, W and mixtures thereof,
   (3) mixtures of tungsten and a metal selected from Fe, Co and mixtures thereof,
   wherein said additive has a density of from about 95% to about 105% of the density of said brazing alloy.

2. A brazing composition according to claim 1 wherein said brazing alloy consisting essentially of about 72% by weight of silver and about 28% by weight of copper and said additive is molybdenum.

3. A brazing composition according to claim 1 wherein said brazing alloy contains about 72% by weight of silver and about 28% by weight of copper and said additive is a mixture iof molybdenum and iron.

4. A brazing composition according to claim 1 wherein said additive has a density of from about 98% to about 102% of the density of said brazing alloy.

* * * * *